(12) United States Patent
Imahori et al.

(10) Patent No.: US 9,718,365 B2
(45) Date of Patent: Aug. 1, 2017

(54) WIRING MEMBER

(71) Applicant: Hitachi Metals, Ltd., Tokyo (JP)

(72) Inventors: Masaaki Imahori, Hitachinaka (JP); Yoshikazu Hayakawa, Hitachi (JP); Takahiro Futatsumori, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 302 days.

(21) Appl. No.: 14/674,706

(22) Filed: Mar. 31, 2015

(65) Prior Publication Data

US 2015/0289423 A1 Oct. 8, 2015

(30) Foreign Application Priority Data

Apr. 2, 2014 (JP) .................. 2014-076249

(51) Int. Cl.
*B60L 11/18* (2006.01)
*H01F 17/06* (2006.01)

(52) U.S. Cl.
CPC ........... *B60L 11/18* (2013.01); *B60L 11/1803* (2013.01); *H01F 17/06* (2013.01); *B60L 2270/145* (2013.01); *B60L 2270/147* (2013.01); *H01F 2017/065* (2013.01); *Y02T 10/7005* (2013.01)

(58) Field of Classification Search
CPC .. H05K 9/0065; H01F 2017/065; B60L 11/18
See application file for complete search history.

(56) References Cited

U.S. PATENT DOCUMENTS

| | | | | |
|---|---|---|---|---|
| 6,080,262 A * | 6/2000 | Wang | ................ | B29C 45/14598 |
| | | | | 156/245 |
| 2004/0173369 A1* | 9/2004 | Cherniski | ............ | H05K 9/0066 |
| | | | | 174/36 |

FOREIGN PATENT DOCUMENTS

JP 2011-157018 A 8/2011

\* cited by examiner

*Primary Examiner* — Jeffrey Shin
(74) *Attorney, Agent, or Firm* — McGinn IP Law Group, PLLCHit

(57) ABSTRACT

A wire harness includes first to third electric wires; a braid shield that covers the first to third electric wires; a tube-shaped electromagnetic wave absorber having a through hole that allows the first to third electric wires to be inserted therethrough, the electromagnetic wave absorber absorbing electromagnetic waves emitted from the first to third electric wires; and a resin tape and fasteners that fix the positions of the electromagnetic wave absorber and the braid shield relative to each other. The electromagnetic wave absorber is movable in an axial direction of the first to third electric wires relative to the first to third electric wires as a result of extension and contraction of the braid shield in the axial direction.

5 Claims, 6 Drawing Sheets

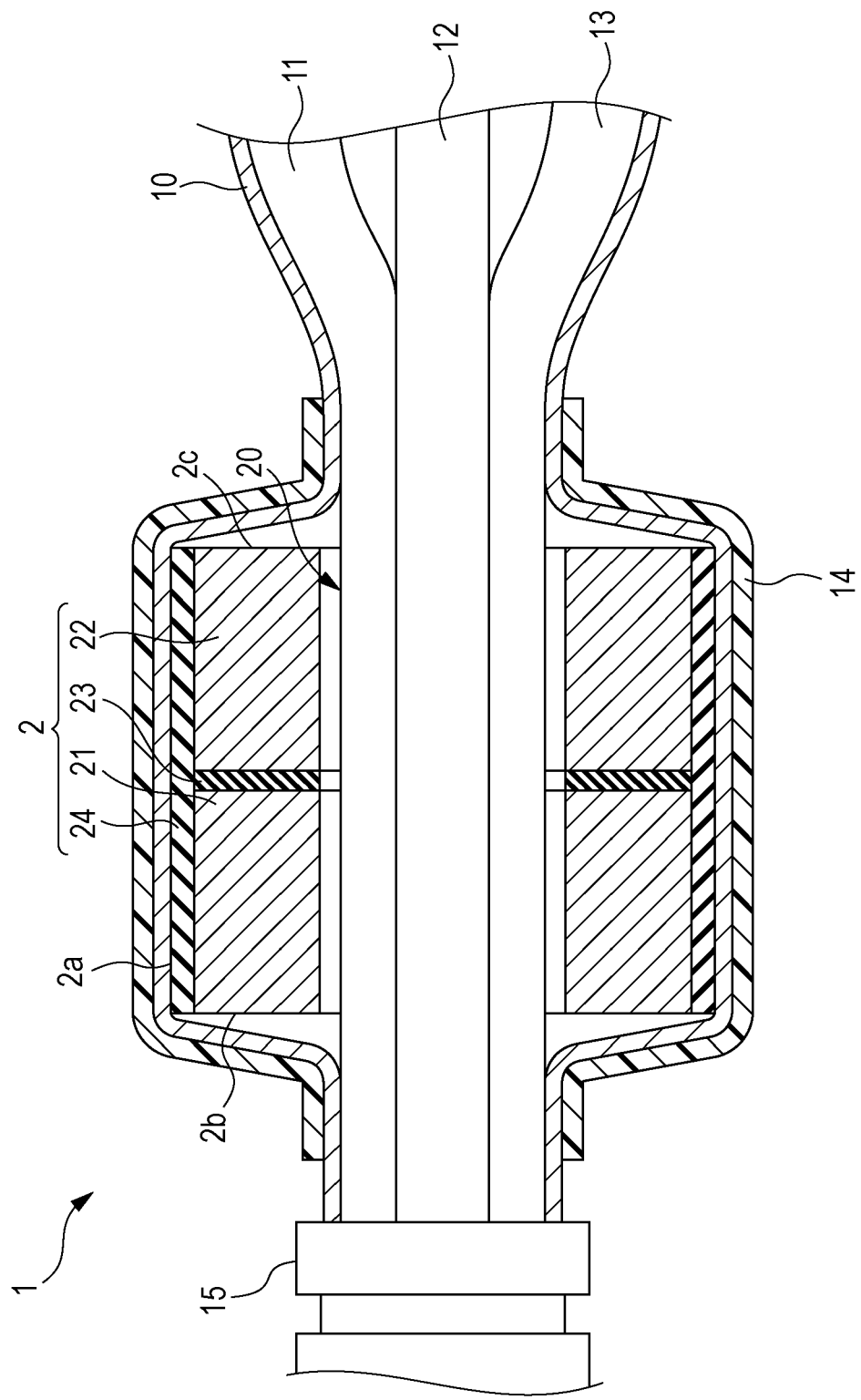

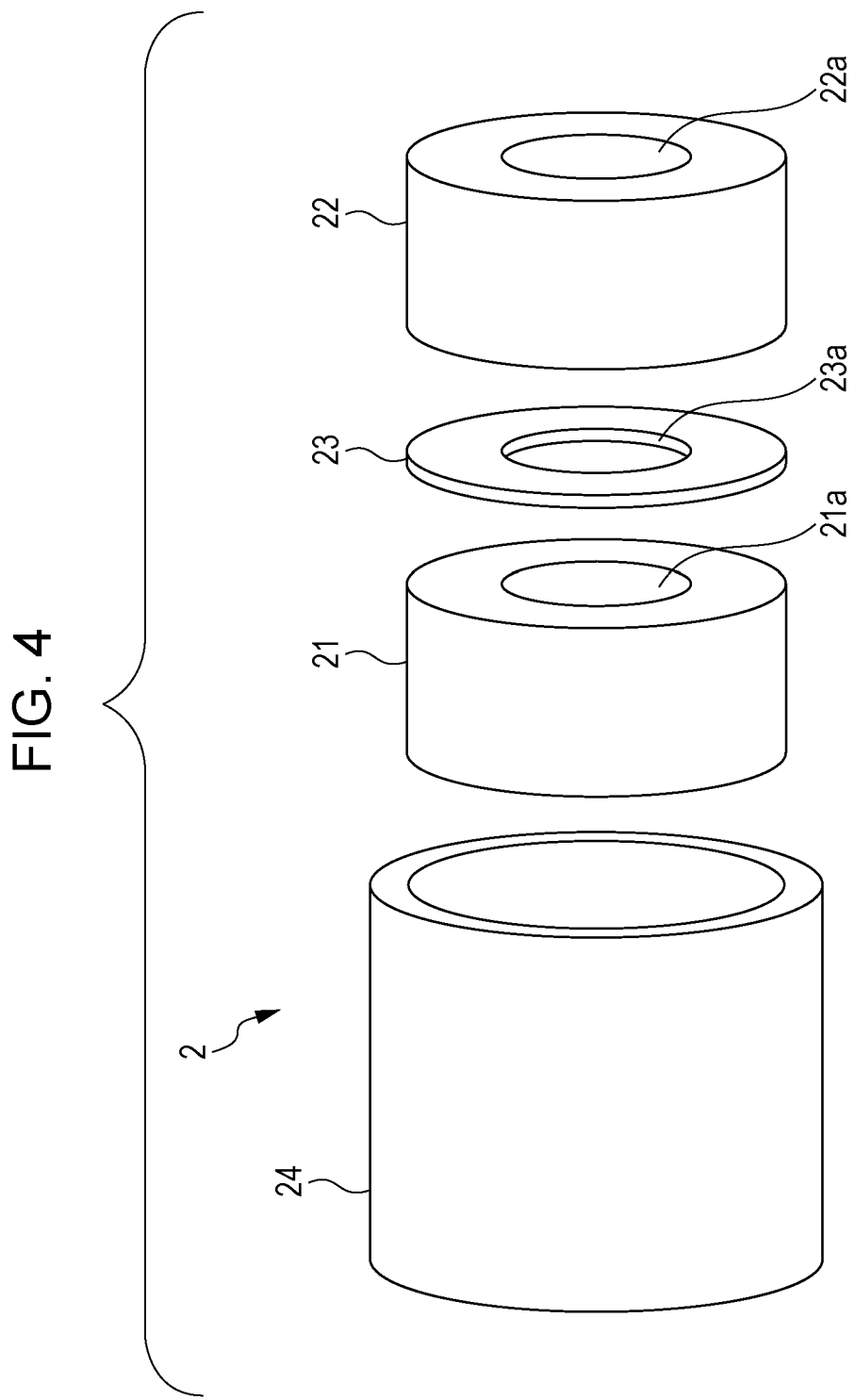

WIRING MEMBER

The present application is based on Japanese patent application No. 2014-076249 filed on Apr. 2, 2014, the entire contents of which are incorporated herein by reference.

BACKGROUND OF THE INVENTION

1. Field of the Invention

The present invention relates to wiring members, particularly to a wiring member including an electromagnetic wave absorber that reduces noise emitted from an electric wire.

2. Description of the Related Art

Some wiring members have been installed in vehicles including an electric motor as a source for driving the vehicle, that is, electric cars or hybrid cars, in order to connect the electric motor and an inverter together. Widely used examples of such wiring members include a wire harness obtained by binding multiple electric wires corresponding to different phases so that alternating currents having multiple different phases are provided to the electric motor (for example, see Japanese Unexamined Patent Application Publication No. 2011-157018).

A wire harness described in Japanese Unexamined Patent Application Publication No. 2011-157018 includes multiple electric wires, which connect an electric motor and an inverter together, and a shield, which prevents electromagnetic waves emitted from these electric wires from affecting the operations of external devices. The shield is made of a metal braided wire obtained by braiding, for example, conducting wires together and covers multiple electric wires.

SUMMARY OF THE INVENTION

The recent improvement of the output power of the electric motor in an electric car or a hybrid car increases the flow rate of electric currents fed from the inverter to the electric motor. The increase of the flow rate brings about an increase of the energy of electromagnetic waves emitted from the electric wires, highly likely affecting the operation of peripheral devices.

A conceivable measure against such an undesirable effect is to insert electric wires into an electromagnetic wave absorber such as a ferrite core. If electric wires are inserted into an electromagnetic wave absorber sized so large as to fully suppress electromagnetic waves, the electromagnetic wave absorber may cause the electric wires to vibrate due to the vibrations resulting from, for example, running of a vehicle and may damage the electric wires.

The inventors of the invention have examined an idea of fixing the electromagnetic wave absorber to a vehicle. In the case of a wiring member structured in such a manner as to allow the electromagnetic wave absorber to freely move along electric wires, when the wiring member is assembled to a vehicle body, the position of the electromagnetic wave absorber has to be manually determined at a predetermined position. On the other hand, in the case where the position of the electromagnetic wave absorber relative to the electric wire is completely fixed, fixing the electromagnetic wave absorber to the vehicle body may be difficult if, for example, an absorber receiving portion of the vehicle body at which the electromagnetic wave absorber is to be fixed is positioned at a low positional accuracy or if the electromagnetic wave absorber is positioned relative to the electric wire with a low positional accuracy. If, in such a case, the electromagnetic wave absorber is fixed to the vehicle body by force, an excessive tension or compressing force acts on the electric wires, which may damage the electric wires.

The present invention was made in view of the above-described circumstances and aims to provide a wiring member that supports an electromagnetic wave absorber in such a manner that the absorber is movable relative to an electric wire within a predetermined range, whereby assembly of the wiring member to a vehicle body or other structures can be facilitated while the electric wire is protected against damages.

To solve the above-described problems, an aspect of the present invention provides a wiring member that includes an electric wire; a braid shield that covers the electric wire; a tube-shaped electromagnetic wave absorber having a through hole that allows the electric wire to be inserted therethrough, the electromagnetic wave absorber absorbing electromagnetic waves emitted from the electric wire; and a position fixer that fixes positions of the electromagnetic wave absorber and the braid shield relative to each other. The electromagnetic wave absorber is movable in an axial direction of the electric wire relative to the electric wire as a result of extension and contraction of the braid shield in the axial direction.

The wiring member according to the aspect of the present invention supports an electromagnetic wave absorber in such a manner that the absorber is movable relative to an electric wire within a predetermined range, whereby assembly of the wiring member to a vehicle body or other structures can be facilitated while the electric wire is protected against damages.

BRIEF DESCRIPTION OF THE DRAWINGS

The foregoing and other exemplary purposes, aspects and advantages will be better understood from the following detailed description of the invention with reference to the drawings, in which:

FIG. 3 is a cross-sectional view of the wire harness at a portion around the electromagnetic wave absorber;

FIG. 4 is an exploded perspective view of the electromagnetic wave absorber;

DESCRIPTION OF THE PREFERRED EMBODIMENTS

Embodiment

Figure 1:
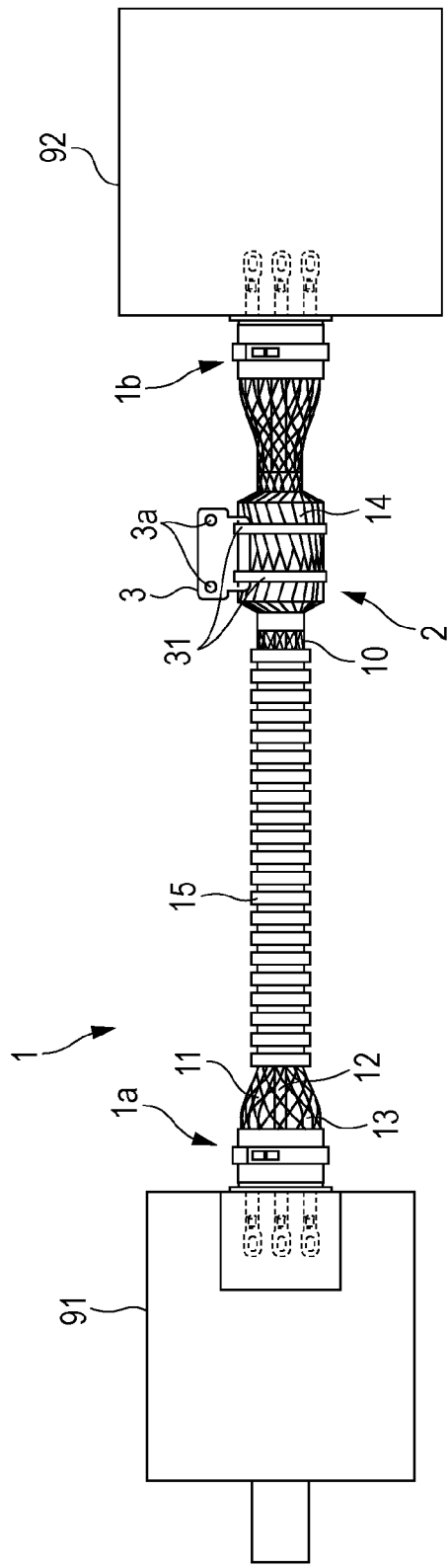
FIG. 1 is a schematic diagram of a wire harness according to an embodiment of the present invention and an electric motor and an inverter connected together with the wire harness.

Referring now to the drawings, and more particularly to FIGS. 1-6, there are shown exemplary embodiments of the methods and structures according to the present invention.

FIG. 1 is a schematic diagram of a wire harness 1 according to an embodiment of the present invention and an electric motor 91 and an inverter 92 connected together by the wire harness 1. The wire harness 1 is an example of a wiring member according to an aspect of the invention.

The wire harness 1 is installed in a vehicle including an electric motor as a source for driving the vehicle. The wire harness 1 is used to feed driving electric current, output from the inverter 92 after being subjected to pulse width modulation (PWM) control, to the electric motor 91, which is a driving source for generating force for driving the vehicle. The driving electric current contains harmonics caused by switching of a switching element such as a power transistor.

The wire harness 1 includes a first electric wire holding portion 1a, fixed to a casing of the electric motor 91, at one end thereof and a second electric wire holding portion 1b, fixed to a casing of the inverter 92, at the other end thereof. The wire harness 1 also includes multiple (three) electric wires (first to third electric wires 11 to 13), used to feed three-phase alternating currents including U-phase, V-phase, and W-phase currents to the electric motor 91, a braid shield 10, which covers the first to third electric wires 11 to 13, a tube-shaped electromagnetic wave absorber 2, which allows the first to third electric wires 11 to 13 to be inserted therethrough, a resin tape 14, wound around the electromagnetic wave absorber 2 and the braid shield 10, a bracket 3, used to fix the electromagnetic wave absorber 2 to a vehicle body of the vehicle driven by the electric motor 91, a fastener 31, which fastens the bracket 3 to the electromagnetic wave absorber 2, and a tube-shaped corrugated tube 15, serving as a container member made of a flexible insulator. Instead of the corrugated tube 15, a metal pipe is also usable as a container member.

The first to third electric wires 11 to 13 are connected to the electric motor 91 at one end thereof and to the inverter 92 at the other end thereof. More specifically, first end portions of the first to third electric wires 11 to 13 protruding from a first electric wire holding portion 1a fixed to the casing of the electric motor 91 are connected to a terminal base, not illustrated, of the electric motor 91. Second end portions of the first to third electric wires 11 to 13 protruding from a second electric wire holding portion 1b fixed to the casing of the inverter 92 are connected to a terminal base, not illustrated, of the inverter 92.

The electromagnetic wave absorber 2 is located near the second electric wire holding portion 1b. Specifically, the electromagnetic wave absorber 2 is located on the side closer to the inverter 92, which causes noise, in the longitudinal direction of the first to third electric wires 11 to 13. Thus, the electromagnetic waves emitted from the first to third electric wires 11 to 13 are efficiently absorbed by the electromagnetic wave absorber 2.

The resin tape 14 is wound around the electromagnetic wave absorber 2 and the outer circumference of a region of the braid shield 10 extending from one end portion to another end portion of the electromagnetic wave absorber 2. The braid shield 10 is squeezed toward the first to third electric wires 11 to 13 by the resin tape 14 on both sides of the electromagnetic wave absorber 2 in the axial direction of the first to third electric wires 11 to 13.

The bracket 3 is located at an outer circumferential portion of the electromagnetic wave absorber 2 and fixed to the portion with belt-shaped fasteners 31. The fasteners 31 squeeze the electromagnetic wave absorber 2 from the outer side of the resin tape 14. The bracket 3 has insertion holes 3a through which bolts are inserted so that the bracket 3 can be fixed to the vehicle body.

The position of the electromagnetic wave absorber 2 relative to the braid shield 10 is fixed by the resin tape 14 and the fasteners 31. The resin tape 14 and the fasteners 31 fix the positions of the electromagnetic wave absorber 2 and the braid shield 10 relative to each other by squeezing the braid shield 10 from the outer side of the braid shield 10 toward the electromagnetic wave absorber 2. In other words, the resin tape 14 and the fasteners 31 are "position fixers" according to an aspect of the invention.

However, the positions of the electromagnetic wave absorber 2 and the braid shield 10 relative to each other may be fixed only by the resin tape 14. Alternatively, the positions of the electromagnetic wave absorber 2 and the braid shield 10 relative to each other may be fixed only by the fasteners 31. In such cases, either the resin tape 14 or the fasteners 31 function/functions as "position fixer/position fixers". Alternatively, the electromagnetic wave absorber 2 and the braid shield 10 may be fixed by bonding. In this case, an adhesive functions as a "position fixer".

The corrugated tube 15 covers part of the first to third electric wires 11 to 13 and the braid shield 10. In this embodiment, the corrugated tube 15 is located between the electromagnetic wave absorber 2 and the first electric wire holding portion 1a. The corrugated tube 15 has alternate portions of large-diameter portions and small-diameter portions in order to have high flexibility.

The first electric wire holding portion 1a and the second electric wire holding portion 1b have similar structures. Subsequently, the structure of the first electric wire holding portion 1a is described in detail as an example with reference to FIGS. 2A and 2B.

Figure 2A:
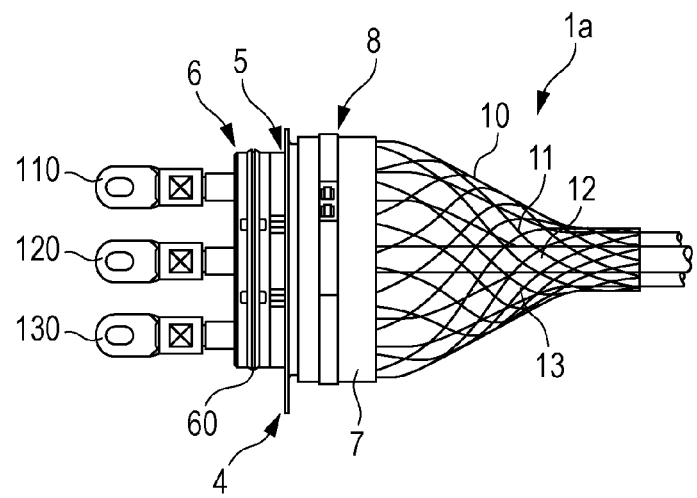
FIG. 2A is an exterior view of a first electric wire holding portion and FIG. 2B is an exploded view of the first electric wire holding portion.
Figure 2B:
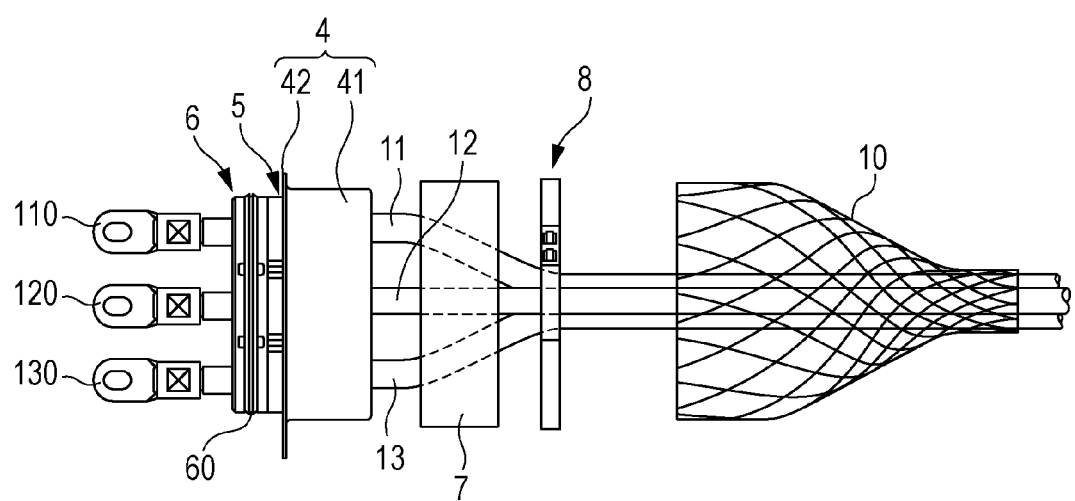

FIG. 2A is an exterior view of the first electric wire holding portion 1a and FIG. 2B is an exploded view of the first electric wire holding portion 1a.

The first electric wire holding portion 1a includes a shield shell 4, which is made of a conductive metal, a resin-made housing 5, which holds the first to third electric wires 11 to 13 and part of which is accommodated in the shield shell 4, a seal holding member 6, which is connected to the housing 5 and holds an annular seal member 60, a ring-shaped member 7, disposed on the outer circumference of the braid shield 10, and a belt-shaped fastening member 8. Connection terminals 110, 120, and 130 are connected to ends of the respective first to third electric wires 11 to 13 by, for example, pressure bonding.

The shield shell 4 includes a tube-shaped container portion 41, which accommodates part of the housing 5, and a flange portion 42, fixed to the casing of the electric motor 91, and these portions are integrated in a single unit. The flange portion 42 has bolt insertion holes, not illustrated, so that the shield shell 4 is fixed to a grounded casing of the electric motor 91 with bolts inserted through the bolt insertion holes.

The housing 5 has insertion holes that allow the first to third electric wires 11 to 13 to be inserted therethrough and is fixed to the container portion 41 of the shield shell 4 by, for example, press fitting. The seal member 60 held by the seal holding member 6 seals the seal holding member 6 off from the inner surface of an attachment hole formed in the casing of the electric motor 91.

The ring-shaped member 7 is, for example, an acetate cloth tape. The ring-shaped member 7 is annularly wound around the outer circumference of the braid shield 10 several times in the state where the braid shield 10 is interposed between the ring-shaped member 7 and the container portion 41 of the shield shell 4. The fastening member 8 is made of, for example, metal such as stainless steel, and disposed around the outer circumference of the ring-shaped member 7. The braid shield 10 is pressed against the shield shell 4 by the fastening force of the fastening member 8. Thus, the braid shield 10 is electrically connected to the casing of the electric motor 91 with the shield shell 4 interposed therebetween.

FIG. 3 is a cross-sectional view of the wire harness 1 at a portion around the electromagnetic wave absorber 2. Specifically, FIG. 3 shows a cross section of the electromagnetic wave absorber 2, the resin tape 14, and the braid shield 10 taken along the first to third electric wires 11 to 13. FIG. 4 is an exploded perspective view of the electromagnetic wave absorber 2.

A through hole 20 that allows the first to third electric wires 11 to 13 to be inserted therethrough is formed in a center portion of the electromagnetic wave absorber 2. Specifically, multiple electric wires (first to third electric wires 11 to 13) are collectively inserted into the through hole 20 of the electromagnetic wave absorber 2. The first to third electric wires 11 to 13 have the same outer diameter, which falls within a range of 10% to 46% of the inner diameter of the through hole 20.

The electromagnetic wave absorber 2 includes a first magnetic core 21, a second magnetic core 22, a first rubber member 23, and a second rubber member 24. The through hole 20 of the electromagnetic wave absorber 2 results from a combination of a through hole 21a formed in a center portion of the first magnetic core 21, a through hole 22a formed in a center portion of the second magnetic core 22, and a through hole 23a formed in a center portion of the first rubber member 23.

Examples usable as the first magnetic core 21 and the second magnetic core 22 include annular core members having high magnetic permeability such as a ferrite core, an amorphous core, and a Permalloy core. In this embodiment, the first magnetic core 21 and the second magnetic core 22 are made of soft ferrite (for example, manganese-zinc ferrite, nickel-zinc ferrite, or copper-zinc ferrite) that exhibits soft magnetism. Besides, hexagonal ferrite (hard ferrite), garnet ferrite, or cobalt ferrite is also usable.

The first magnetic core 21 and the second magnetic core 22 are arranged side by side in the axial direction of the first to third electric wires 11 to 13. The first magnetic core 21 may be formed as a single annular unit or formed into an annular member by combining a pair of members having a semicircular cross section. The second magnetic core 22 may be formed similarly.

The first magnetic core 21 and the second magnetic core 22 absorb electromagnetic waves (electromagnetic noise) emitted from the first to third electric wires 11 to 13 and convert the energy of the electromagnetic waves into dynamic energy such as vibrations or thermal energy. This absorption hinders the electromagnetic waves emitted from the wire harness 1 from adversely affecting peripheral control devices or other devices.

The first rubber member 23 is a disk-shaped member tightly held between the first magnetic core 21 and the second magnetic core 22 and prevents wear caused by vibrations of the vehicle or vibrations resulting from the first magnetic core 21 and the second magnetic core 22 absorbing electromagnetic waves. The second rubber member 24 is a tube-shaped member disposed on the outer circumference of the first magnetic core 21 and the second magnetic core 22 with its inner circumferential surface facing the outer circumferential surfaces of the first magnetic core 21 and the second magnetic core 22. The first rubber member 23 and the second rubber member 24 are integrated with the first magnetic core 21 and the second magnetic core 22 by, for example, bonding. The outer diameter of the electromagnetic wave absorber 2 is, for example, 58 mm. An example usable as the electromagnetic wave absorber 2 is an absorber that weighs within a range of 50 g to 600 g.

Method for Manufacturing Wire Harness 1

Figure 5A:
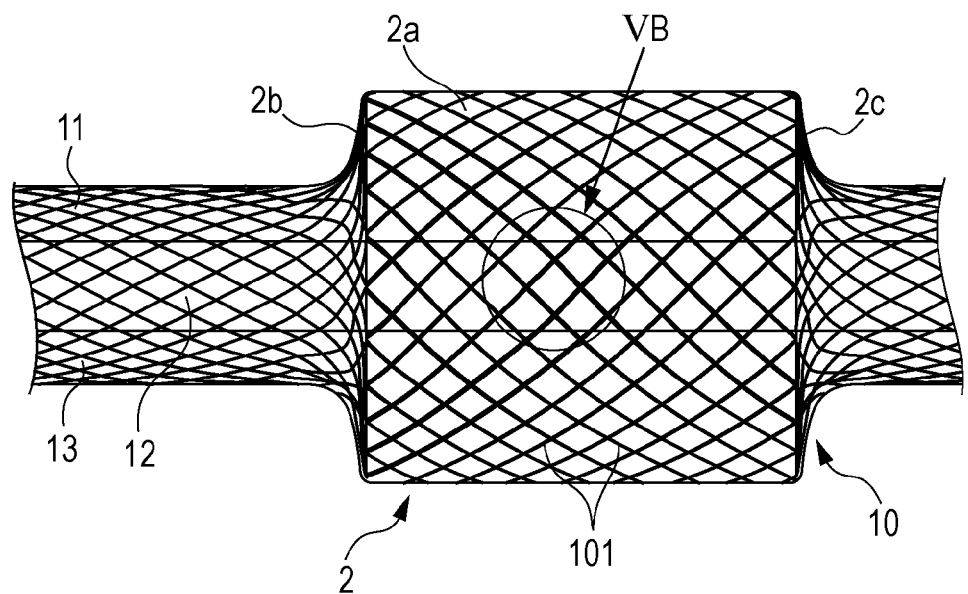
FIG. 5A is a side view of the electromagnetic wave absorber and a braid shield during manufacture before being covered with a resin tape and FIG. 5B is an enlarged view of a portion VB in FIG. 5A.
Figure 5B:
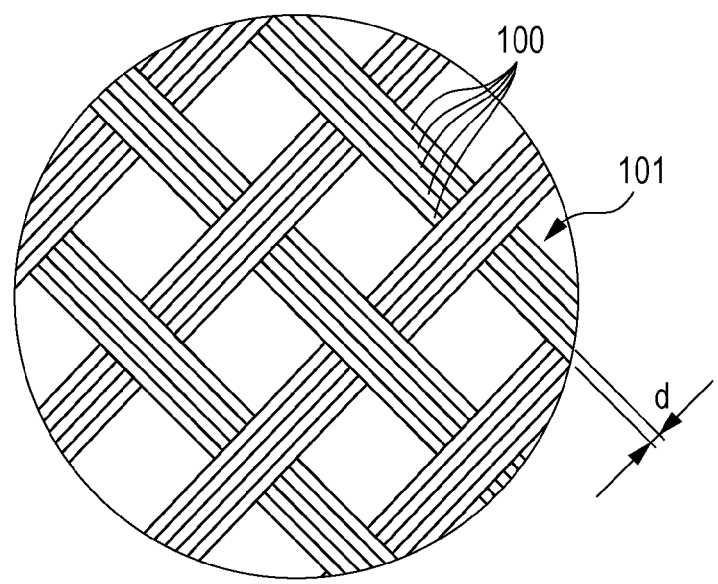

FIG. 5A is a side view of the electromagnetic wave absorber 2 and a braid shield 10 during manufacture before being covered with a resin tape 14 and FIG. 5B is an enlarged view of a portion VB in FIG. 5A. In FIG. 5A, the first electric wire holding portion 1a is disposed on the left of the first to third electric wires 11 to 13 and the second electric wire holding portion 1b is disposed on the right of the first to third electric wires 11 to 13.

The wire harness 1 is assembled in the following procedure during manufacture. Firstly, an insulating electric wire obtained by covering a central conductor with an insulator is cut into pieces having a predetermined length to form first to third electric wires 11 to 13. These first to third electric wires 11 to 13 are collectively inserted into the braid shield 10. At this time, the inner diameter of the braid shield 10 is larger than the thickness of the bundle of the first to third electric wires 11 to 13 and smaller than the outer diameter of the electromagnetic wave absorber 2.

Subsequently, the circumference of a portion of the braid shield 10 having a predetermined length from one end (end near the second electric wire holding portion 1b in this embodiment) in the longitudinal direction of the braid shield 10 is expanded so as to have an inner diameter larger than the outer diameter of the electromagnetic wave absorber 2. Then, the electromagnetic wave absorber 2 is placed inside the expanded portion of the braid shield 10. Thereafter, the portion of the braid shield 10 into which the electromagnetic wave absorber 2 is inserted is pressed against the first to third electric wires 11 to 13 so as to reduce its diameter and to be in a state as illustrated in FIG. 5A.

In this state, the outer circumferential surface 2a and both axial end surfaces 2b and 2c of the electromagnetic wave absorber 2 are covered with the braid shield 10 so as to restrict the movement of the electromagnetic wave absorber 2 relative to the first to third electric wires 11 to 13 in the axial direction. In other words, the braid shield 10 restricts the movement of the electromagnetic wave absorber 2 in the axial direction by covering the outer circumferential surface 2a and both axial end surfaces 2b and 2c of the electromagnetic wave absorber 2.

Subsequently, the corrugated tube 15 is fitted on the braid shield 10 and the shield shell 4, the housing 5, and the seal holding member 6 are fitted on each of the first and second end portions of the first to third electric wires 11 to 13. Thereafter, insulators at both end portions of the first to third electric wires 11 to 13 are removed so that the central conductors are exposed. The connection terminals 110, 120, and 130 are press-fitted to the exposed central conductors. Thereafter, each end portion of the braid shield 10 is fixed to the outer circumference of the shield shell 4 using the ring-shaped member 7 and the fastening member 8. Thus, the first electric wire holding portion 1a and the second electric wire holding portion 1b are complete.

Thereafter, the resin tape 14 is wound around the outer circumference of a region of the braid shield 10 covering the electromagnetic wave absorber 2 and the bracket 3 is fixed to the outer side of the resin tape 14 using the fastener 31. This completes assembly of the wire harness 1.

Structure of Braid Shield 10

As illustrated in FIGS. 5A and 5B, the braid shield 10 is formed by braiding strand braids 101, each consisting of multiple strands 100, into a lattice pattern. In this embodiment, the number of carriers of the braid shield 10 is five and the number of ends of the braid shield 10 is 36. Here, the number of carriers represents the number of strands 100 included in one strand braid 101 and the number of ends represents the number of strand braids 101 included in the braid shield 10. The strand braids 101 are wound at a pitch of, for example, 100 mm to 400 mm.

Each strand 100 is a plated copper wire, specifically, a tinned annealed copper wire. Instead, a nickel-plated or silver-plated copper wire may be used as the strand 100.

Preferably, the strand diameter d (mm) of each strand 100 falls within a range of $0.12 \leq d \leq 0.32$ (greater than or equal to 0.12 mm and fewer than or equal to 0.32 mm). When the strand 100 has a strand diameter d below 0.12 mm, the strand 100 has low strand strength and may break during manufacture of the braid shield 10 (during braiding). On the other hand, when the strand 100 has a strand diameter d over 0.32 mm, the braid shield 10 is stiff (the braid shield 10 less easily expands in the radial direction), whereby the workability of inserting the first to third electric wires 11 to 13 or the electromagnetic wave absorber 2 into the braid shield 10 may decrease.

When the number of carriers of the braid shield 10 is denoted by n and the number of ends of the braid shield 10 is denoted by m, desirably, the braid shield 10 satisfies $1 \leq n \leq 15$ and $10 \leq m \leq 50$. If the number m of ends is below 10, gaps between the strand braids 101 are so large that the braid shield 10 may fail to hold the electromagnetic wave absorber 2. If the number n of carriers exceeds 15 or the number m of ends exceeds 50, the costs of the braid shield 10 increase. Moreover, the braid shield 10 is stiff (the braid shield 10 less easily expands in the radial direction), whereby the workability of inserting the first to third electric wires 11 to 13 or the electromagnetic wave absorber 2 into the braid shield 10 may decrease.

Specifically, use of a braid shield 10 in which the number n of carriers falls within a range of 1 to 15 and the number m of ends falls within a range of 10 to 50 enables the electromagnetic wave absorber 2 to move in the axial direction as a result of extension and contraction of the braid shield 10 while the workability during manufacture is kept in good condition. In addition, the use of the above-described braid shield 10 can reliably restrict the position of the electromagnetic wave absorber 2 relative to the first to third electric wires 11 to 13 within a predetermined range appropriate for assembly into the vehicle body.

Figure 6A:
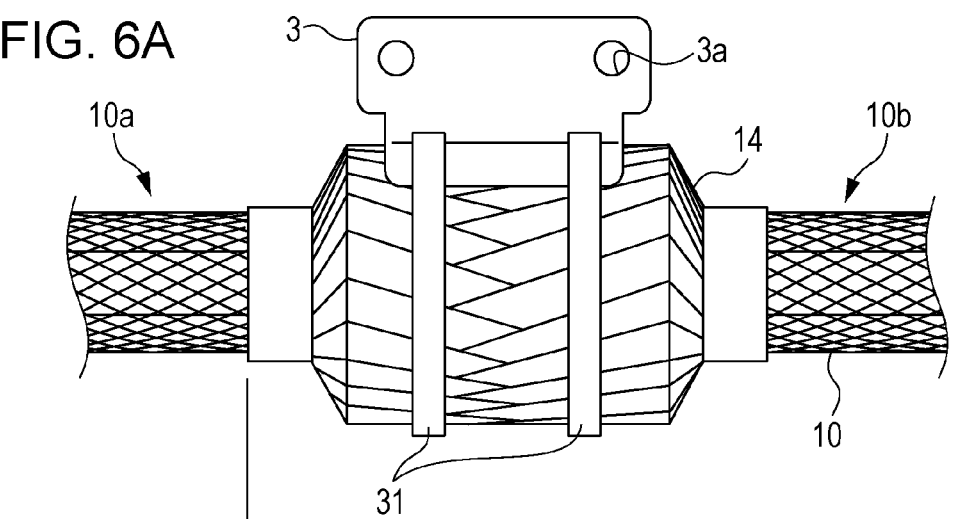
FIGS. 6A to 6C are schematic views of the electromagnetic wave absorber covered with the resin tape before and after the absorber is moved in the axial direction relative to first to third electric wires.
Figure 6B:
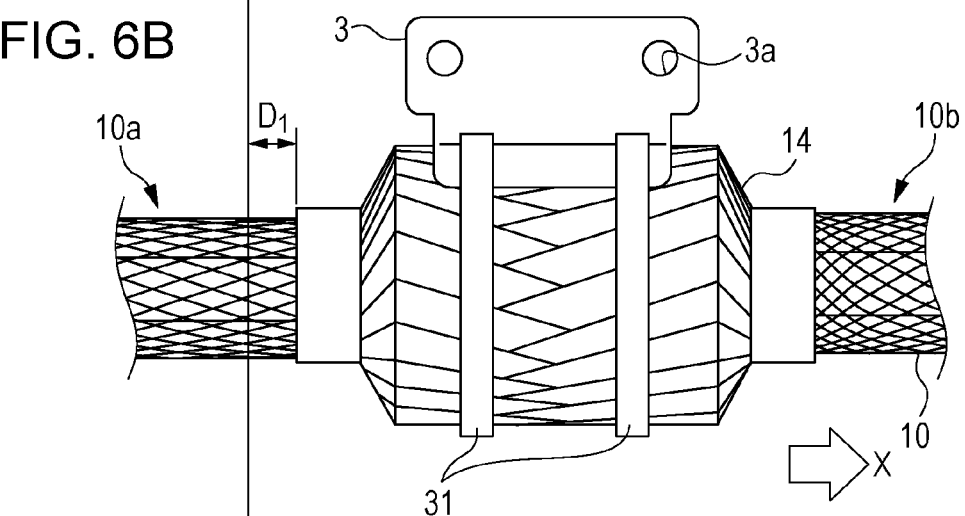
Figure 6C:
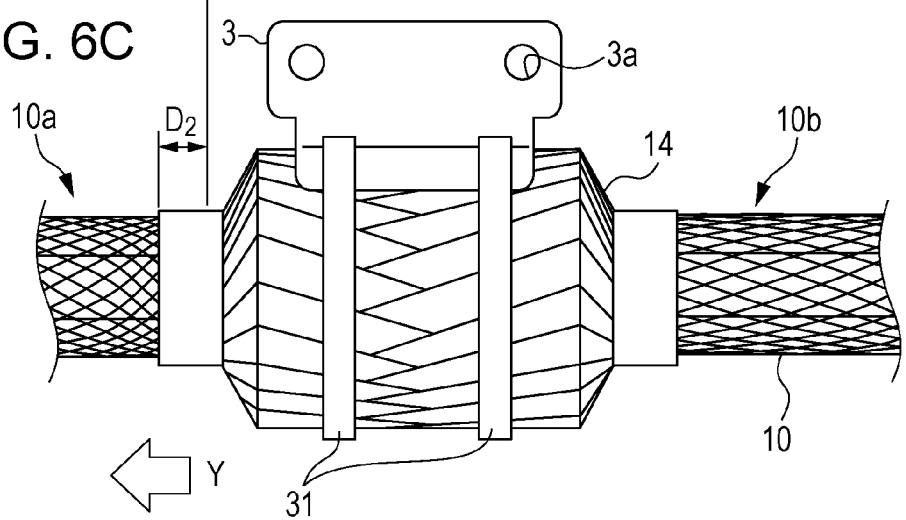

FIGS. 6A to 6C are schematic views of the electromagnetic wave absorber 2 covered with the resin tape 14 before and after the absorber 2 is moved in the axial direction relative to the first to third electric wires 11 to 13. In FIGS. 6A to 6C, as in the case of FIG. 5A, the first electric wire holding portion 1a is disposed on the left and the second electric wire holding portion 1b is disposed on the right.

FIG. 6A shows the electromagnetic wave absorber 2 in a neutral position. In this state, the strand density in a region of the braid shield 10 adjacent to the electromagnetic wave absorber 2 and between the electromagnetic wave absorber 2 and the first electric wire holding portion 1a (this region is referred to as a "first region 10a", below) is substantially equal to the strand density in a region of the braid shield 10 adjacent to the electromagnetic wave absorber 2 and between the electromagnetic wave absorber 2 and the second electric wire holding portion 1b (this region is referred to as a "second region 10b", below).

FIG. 6B shows the state where the electromagnetic wave absorber 2 is displaced from the neutral position illustrated in FIG. 6A by a distance $D_1$ in the direction of arrow X (toward the second electric wire holding portion 1b). In this state, the first region 10a of the braid shield 10 is stretched in the axial direction and the second region 10b of the braid shield 10 is contracted in the axial direction. Thus, the strand density in the second region 10b of the braid shield 10 is higher than the strand density in the first region 10a of the braid shield 10.

FIG. 6C shows the state where the electromagnetic wave absorber 2 is displaced from the neutral position illustrated in FIG. 6A by a distance $D_2$ in the direction of arrow Y (toward the first electric wire holding portion 1a). In this state, the first region 10a of the braid shield 10 is contracted in the axial direction and the second region 10b of the braid shield 10 is stretched in the axial direction. Thus, the strand density in the first region 10a of the braid shield 10 is higher than the strand density in the second region 10b of the braid shield 10.

In this manner, the electromagnetic wave absorber 2 is movable relative to the first to third electric wires 11 to 13 in the axial direction as a result of extension and contraction of the braid shield 10 in the axial direction of the first to third electric wires 11 to 13.

Operations and Effects of Embodiment

The above-described first embodiment brings about the following operations and effects.

(1) The position of the electromagnetic wave absorber 2 relative to the braid shield 10 is fixed using the resin tape 14 and the fasteners 31 and is movable relative to the first to third electric wires 11 to 13 in the axial direction as a result of extension and contraction of the braid shield 10. Thus, the electromagnetic wave absorber 2 can be supported so as to be movable relative to the first to third electric wires 11 to 13 within a predetermined range. Specifically, when the bracket 3 is fixed to the vehicle body, the electromagnetic wave absorber 2 and the bracket 3 can be moved in the X direction or the Y direction with respect to the neutral position illustrated in FIG. 6A. Thus, even when a portion of the vehicle body to which the bracket 3 is fixed is positioned at a low positional accuracy or the electromagnetic wave absorber 2 is positioned relative to the first to third electric wires 11 to 13 at a low positional accuracy and thus has dimensional errors, extension and contraction of the braid shield 10 can absorb such dimensional errors, whereby the wire harness 1 can be easily assembled to the vehicle body. In addition, fixing the electromagnetic wave absorber 2 to the vehicle body using the bracket 3 prevents the first to third electric wires 11 to 13 from being damaged as a result of being shaken by the electromagnetic wave absorber 2 due to vibrations caused during running of the vehicle. In other words, the embodiment can facilitate assembly of the wire harness 1 to the vehicle body while the first to third electric wires 11 to 13 are protected against damages.

(2) Since the braid shield 10 covers the outer circumferential surface 2a of the electromagnetic wave absorber 2, the positions of the electromagnetic wave absorber 2 and the braid shield 10 relative to each other can be easily fixed by squeezing the braid shield 10 using the resin tape 14 and the fasteners 31 from the outer side of the braid shield 10.

(3) In the braid shield 10, the number of carriers falls within a range of 1 to 15 and the number of ends falls within a range of 10 to 50. Thus, extension and contraction of the braid shield 10 can restrict the movement of the electromagnetic wave absorber 2 in the axial direction within a predetermined range appropriate for the wire harness 1 to be fixed to the vehicle body.

(4) The braid shield 10 is squeezed toward the first to third electric wires 11 to 13 by the resin tape 14 at both ends of the electromagnetic wave absorber 2. Thus, the movement of the electromagnetic wave absorber 2 relative to the braid shield 10 can be reliably restricted.

(5) The bracket 3 is disposed at a position outside the outer circumferential surface of the electromagnetic wave absorber 2. Thus, the bracket 3 allows the electromagnetic wave absorber 2 to be easily fixed to the vehicle body.

SUMMARY OF EMBODIMENT

Now, technical ideas understood from the above-described embodiment are described in cooperation with reference symbols or other descriptions used in the embodiments. However, the reference symbols used in the following description do not limit components in the scope of claim to the components or the like specifically described in the embodiment.

[1] A wiring member (wire harness 1) includes an electric wire (11 to 13); a braid shield (10) that covers the electric wire (11 to 13); a tube-shaped electromagnetic wave absorber (2) having a through hole (20) that allows the electric wire (11 to 13) to be inserted therethrough, the electromagnetic wave absorber (2) absorbing electromagnetic waves emitted from the electric wire (11 to 13); and a position fixer (resin tape 14, fastener 31) that fixes positions of the electromagnetic wave absorber (2) and the braid shield (10) relative to each other. The electromagnetic wave absorber (2) is movable in an axial direction of the electric wire (11 to 13) relative to the electric wire (11 to 13) as a result of extension and contraction of the braid shield (10) in the axial direction.

[2] In the wiring member (wire harness 1) described in the paragraph [1], the braid shield (10) covers an outer circumferential surface of the electromagnetic wave absorber (2) and the position fixer (resin tape 14, fastener 31) squeezes the braid shield (10) from an outer side of the braid shield (10) to fix the positions of the electromagnetic wave absorber (2) and the braid shield (10) relative to each other.

[3] In the wiring member (wire harness 1) described in the paragraph [1] or [2], the braid shield 10 satisfies $1 \leq n \leq 15$ and $10 \leq m \leq 50$ where the number of carriers of the braid shield (10) is denoted by n and the number of ends of the braid shield is denoted by m.

[4] In the wiring member (wire harness 1) described in any one of the paragraphs [1] to [3], the electric wire (11 to 13) is connected to an electric motor (91), which generates force for driving a vehicle, at one end thereof and to an inverter (92), which feeds driving electric current to the electric motor (91), at the other end thereof.

[5] The wiring member (wire harness 1) described in the paragraph [4] further includes a bracket (3) that allows the electromagnetic wave absorber (2) to be fixed to a vehicle body of the vehicle. The bracket (3) is fixed at a position outside an outer circumferential surface of the electromagnetic wave absorber (2) using the position fixer (resin tape 14, fastener 31).

An embodiment of the invention has been described thus far, but the above-described embodiment does not limit the scope of claim of the invention. It should be noted that all the combined features described in the embodiment are not necessarily indispensable to solve the problems.

The invention can be embodied by appropriately modifying the embodiment without departing from the gist of the invention. For example, the above-described embodiment has been described using a case where the wire harness 1 is consisted of three electric wires (first to third electric wires 11 to 13). However, the invention is not limited to this case and a wire harness may be consisted of one electric wire, two electric wires, or four or more electric wires.

The above-described embodiment has been described using a case where the electromagnetic wave absorber 2 includes the first magnetic core 21, the second magnetic core 22, the first rubber member 23, and the second rubber member 24. However, the electromagnetic wave absorber 2 does not have to include rubber members (first rubber member 23 and second rubber member 24). In other words, the electromagnetic wave absorber 2 may be consisted of one or more magnetic cores.

The above-described embodiment has been described using a case where the braid shield 10 is located so as to cover the outer circumferential surface 2a of the electromagnetic wave absorber 2. Specifically, the embodiment has been described using a case where the electromagnetic wave absorber 2 is located inward of the braid shield 10. However, the invention is not limited to this case and the electromagnetic wave absorber 2 may be located outward of the braid shield 10. Specifically, the braid shield 10 may be inserted into the through hole 20 of the electromagnetic wave absorber 2.

The above-described embodiment has been described using a case where the first to third electric wires 11 to 13 are collectively inserted into the through hole 20 of the electromagnetic wave absorber 2. However, the wire harness 1 may include multiple electromagnetic wave absorbers 2 and the first to third electric wires 11 to 13 may be inserted into through holes 20 of the respective electromagnetic wave absorbers 2.

The purpose of use of the wire harness 1 is not limited to a particular purpose: the wire harness 1 may be used for communications between electronic devices of various types including computers.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

What is claimed is:

1. A wiring member, comprising:
   an electric wire;
   a braid shield that covers the electric wire;
   a tube-shaped electromagnetic wave absorber having a through hole that allows the electric wire to be inserted therethrough, the electromagnetic wave absorber absorbing electromagnetic waves emitted from the electric wire; and
   a position fixer that fixes positions of the electromagnetic wave absorber and the braid shield relative to each other,
   wherein the electromagnetic wave absorber is movable in an axial direction of the electric wire relative to the electric wire as a result of extension and contraction of the braid shield in the axial direction.

2. The wiring member described in claim 1,
   wherein the braid shield covers an outer circumferential surface of the electromagnetic wave absorber, and
   wherein the position fixer squeezes the braid shield from an outer side of the braid shield to fix the positions of the electromagnetic wave absorber and the braid shield relative to each other.

3. The wiring member described in claim 1, wherein the braid shield satisfies $1 \leq n \leq 15$ and $10 \leq m \leq 50$ where the number of carriers of the braid shield is denoted by n and the number of ends of the braid shield is denoted by m.

4. The wiring member described in claim 1, wherein the electric wire is connected to an electric motor, which generates force for driving a vehicle, at one end thereof and to an inverter, which feeds driving electric current to the electric motor, at the other end thereof.

5. The wiring member described in claim 4, further comprising a bracket that allows the electromagnetic wave absorber to be fixed to a vehicle body of the vehicle,
   wherein the bracket is fixed at a position outside an outer circumferential surface of the electromagnetic wave absorber using the position fixer.

\* \* \* \* \*